US008401094B2

(12) United States Patent
Pan et al.

(10) Patent No.: US 8,401,094 B2
(45) Date of Patent: Mar. 19, 2013

(54) MIMO WIRELESS COMMUNICATION METHOD AND APPARATUS FOR TRANSMITTING AND DECODING RESOURCE BLOCK STRUCTURES BASED ON A DEDICATED REFERENCE SIGNAL MODE

(75) Inventors: Kyle Jung-Lin Pan, Smithtown, NY (US); Donald M. Grieco, Manhasset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1107 days.

(21) Appl. No.: 12/052,842

(22) Filed: Mar. 21, 2008

(65) Prior Publication Data
US 2008/0232494 A1 Sep. 25, 2008

Related U.S. Application Data

(60) Provisional application No. 60/896,093, filed on Mar. 21, 2007.

(51) Int. Cl.
*H04K 1/10* (2006.01)
(52) U.S. Cl. .................... 375/260; 370/210; 375/267
(58) Field of Classification Search ............... 370/203, 370/210, 220, 335, 230.1; 375/260, 220
See application file for complete search history.

(56) References Cited

U.S. PATENT DOCUMENTS

| 5,867,478 | A * | 2/1999 | Baum et al. .................. 370/203 |
| 6,430,724 | B1 | 8/2002 | Laneman et al. |
| 7,809,074 | B2 * | 10/2010 | Kotecha et al. ............... 375/267 |
| 2005/0124352 | A1 | 6/2005 | Fernandez-Corbaton et al. |
| 2006/0018287 | A1 | 1/2006 | Walton et al. |
| 2006/0159079 | A1 * | 7/2006 | Sachs et al. .................. 370/389 |
| 2006/0262870 | A1 * | 11/2006 | Khan ............................ 375/260 |
| 2007/0217531 | A1 * | 9/2007 | Kwon et al. ................... 375/260 |
| 2007/0223440 | A1 * | 9/2007 | Ho et al. ....................... 370/342 |
| 2007/0250742 | A1 * | 10/2007 | Kowalski ...................... 714/701 |

(Continued)

FOREIGN PATENT DOCUMENTS

| EP | 1 898 542 | 3/2008 |
| RU | 2 149 518 C1 | 5/2000 |

(Continued)

OTHER PUBLICATIONS

CATT, "Downlink Dedicated Reference Signal Structure for Adaptive Beam-forming in EUTRA TDD," 3GPP TSG RAN WG1 Meeting #47, R1-063286 (Nov. 2006).

(Continued)

*Primary Examiner* — Leon-Viet Nguyen
(74) *Attorney, Agent, or Firm* — Julian F. Santos

(57) ABSTRACT

The transmission and decoding of resource blocks (RBs) transmitted via a multiple-input multiple-output (MIMO) antenna having a plurality of transmit antennas is disclosed. Each RB includes a plurality of resource elements (REs). Each RE is reserved for one of a common reference signal (CRS) associated with one of the transmit antennas, a dedicated reference signal (DRS) including a single beamformed or precoded pilot, a DRS including a composite beamformed or precoded pilot, and a data symbol. Each RB may include a "control type" data symbol that indicates a DRS mode associated with the RB. In one DRS mode, each DRS includes a single beamformed or precoded pilot. In another DRS mode, each DRS includes a composite beamformed or precoded pilot. In yet another DRS mode, single beamformed or precoded pilots, and composite beamformed or precoded pilots, may coexist and be transmitted simultaneously within the same RBs or in different RBs.

28 Claims, 11 Drawing Sheets

U.S. PATENT DOCUMENTS

2008/0069048 A1\* 3/2008 Prakash et al. ................ 370/331
2009/0011699 A1\* 1/2009 Murakami et al. ........... 455/3.06

FOREIGN PATENT DOCUMENTS

| WO | WO-94/08432 A1 | 4/1994 |
| --- | --- | --- |
| WO | WO-2004/040827 A2 | 5/2004 |
| WO | WO-2006/019579 A2 | 2/2006 |
| WO | 2006/134949 | 12/2006 |

OTHER PUBLICATIONS

Motorola, "Proposal for Dedicated Pilots in Downlink Precoding for EUTRA MIMO," 3GPP TSG RAN WG1 Meeting #48, R1-070770 (Feb. 2007).

\* cited by examiner

MIMO WIRELESS COMMUNICATION METHOD AND APPARATUS FOR TRANSMITTING AND DECODING RESOURCE BLOCK STRUCTURES BASED ON A DEDICATED REFERENCE SIGNAL MODE

CROSS REFERENCE TO RELATED APPLICATIONS

This application claims the benefit of U.S. Provisional Application Ser. No. 60/896,093 filed Mar. 21, 2007, which is incorporated by reference as if fully set forth.

FIELD OF INVENTION

This application is related to wireless communications.

BACKGROUND

Beamforming or precoding information needs to be communicated from a transmitter, (e.g., a base station), to receiver, (e.g., a wireless transmit/receive unit (WTRU)), to avoid a channel mismatch between transmitting and receiving signals. This is in particularly important for multiple-input multiple-output (MIMO) data demodulation when beamforming and precoding are used. When a receiver uses incorrect channel responses for data detection, significant performance degradation can occur.

Generally, beamforming or precoding information may be communicated using explicit control signaling, particularly when the transmitter and receiver are restricted to the use of limited sets of antenna weight coefficients for beamforming and precoding. The limited sets of antenna weight coefficients are sometimes referred to as a beamforming or precoding codebook. Explicit signaling to communicate beamforming or precoding information from a transmitter to a receiver may incur large signaling overhead, particularly for a large size codebook. When the transmitter and the receiver are not restricted to the use limited sets of antenna weight coefficients for beamforming and precoding, the explicit signaling of beamforming or precoding information via a control channel is no longer possible. Since incorrect effective channel response information or precoding information results in significant bit error rate (BER) and/or block error rate (BLER) floors, efficient methods for obtaining accurate effective channel response information are desirable. Additionally, efficient schemes for achieving satisfactory performance and overhead trade-off are desirable.

SUMMARY

The transmission and decoding of resource blocks (RBs) transmitted via a MIMO antenna having a plurality of transmit antennas is disclosed. Each RB includes a plurality of resource elements (REs). Each RE is reserved for one of a common reference signal (CRS) associated with one of the transmit antennas, a dedicated reference signal (DRS) including a single beamformed or precoded pilot, a DRS including a composite beamformed or precoded pilot, and a data symbol. Each RB may include a "control type" data symbol that indicates a DRS mode associated with the RB. In one DRS mode, each DRS includes a single beamformed or precoded pilot. In another DRS mode, each DRS includes a composite beamformed or precoded pilot. In yet another DRS mode, single beamformed or precoded pilots, and composite beamformed or precoded pilots, may coexist and be transmitted simultaneously within the same RBs or in different RBs.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
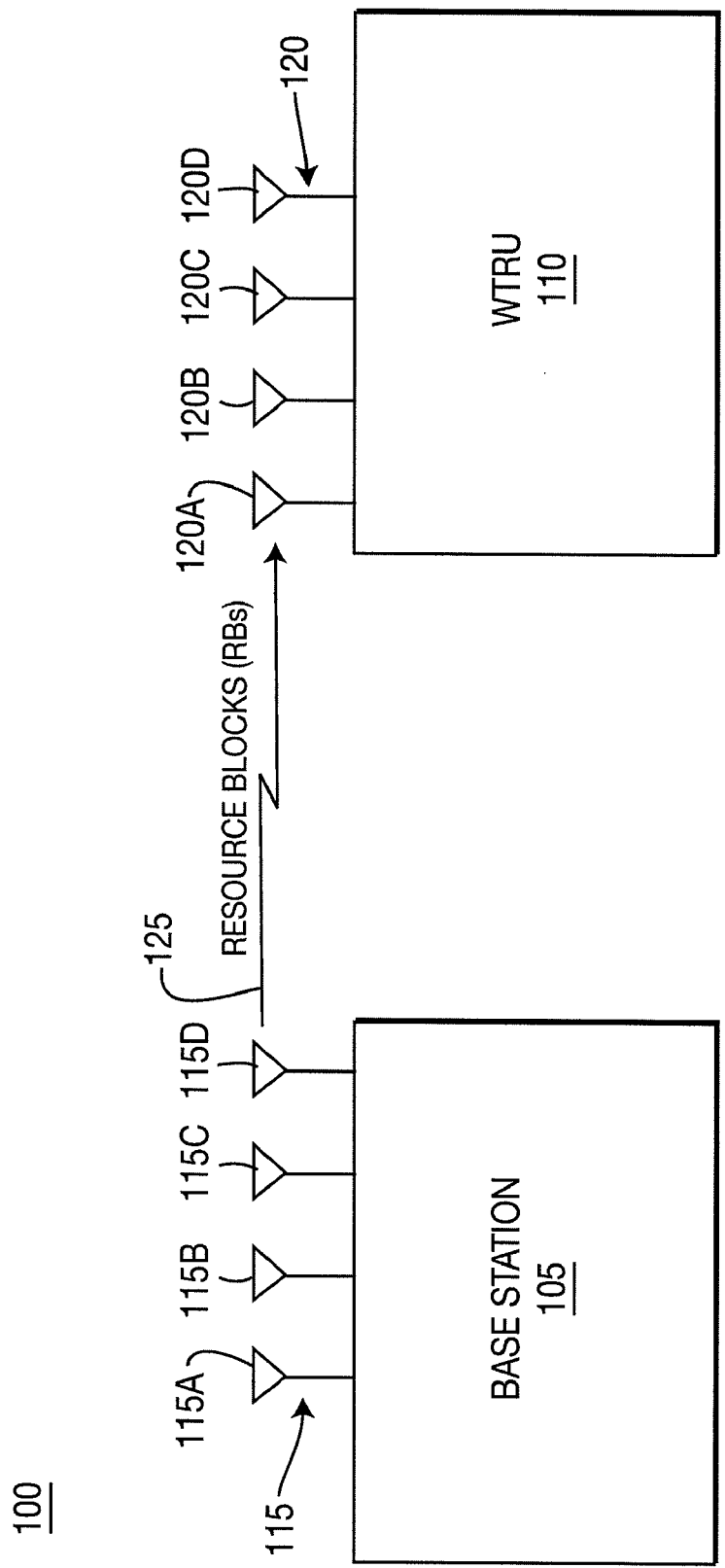
FIG. 1 shows a wireless communication system including a base station and a WTRU.

FIG. 1 shows a wireless communication system 100 including a base station 105 and a WTRU 110. The base station 105 may include a MIMO antenna 115 having a plurality of transmit antennas 115A, 115B, 115C and 115D. The WTRU 110 may also include a MIMO antenna 120 having a plurality of receive antennas 120A, 120B, 120C and 120D. The base station 105 communicates with the WTRU 110 by transmitting RBs 125 to the WTRU 110. Each of the RBs 125 has a particular RB structure that includes a plurality of REs. In accordance with the particular RB structure, each RE may be reserved for one of the following:

1) a common reference signal (CRS) associated with one of the transmit antennas 115A, 115B, 115C and 115D of the base station 105;
2) a DRS including a single beamformed or precoded pilot;
3) a DRS including a composite beamformed or precoded pilot; and
4) a data symbol.

At least a portion of data symbols reserved by REs of the RBs 125 are "control type" data symbols that include a DRS mode indicator. Once decoded, the DRS mode indicator enables the WTRU 110 to properly detect/demodulate data symbols in the RBs 125 transmitted by the base station 105.

Several ways of balancing between performance and overhead for obtaining effective channel response information and/or beamforming or precoding information, (such as by PMI validation), may be utilized. A hybrid DRS scheme in which REs are reserved for DRSs including a single beamformed or precoded pilot and/or a composite beamformed or precoded pilot is introduced, where a plurality (N) of DRSs per RB are used.

Figure 2:
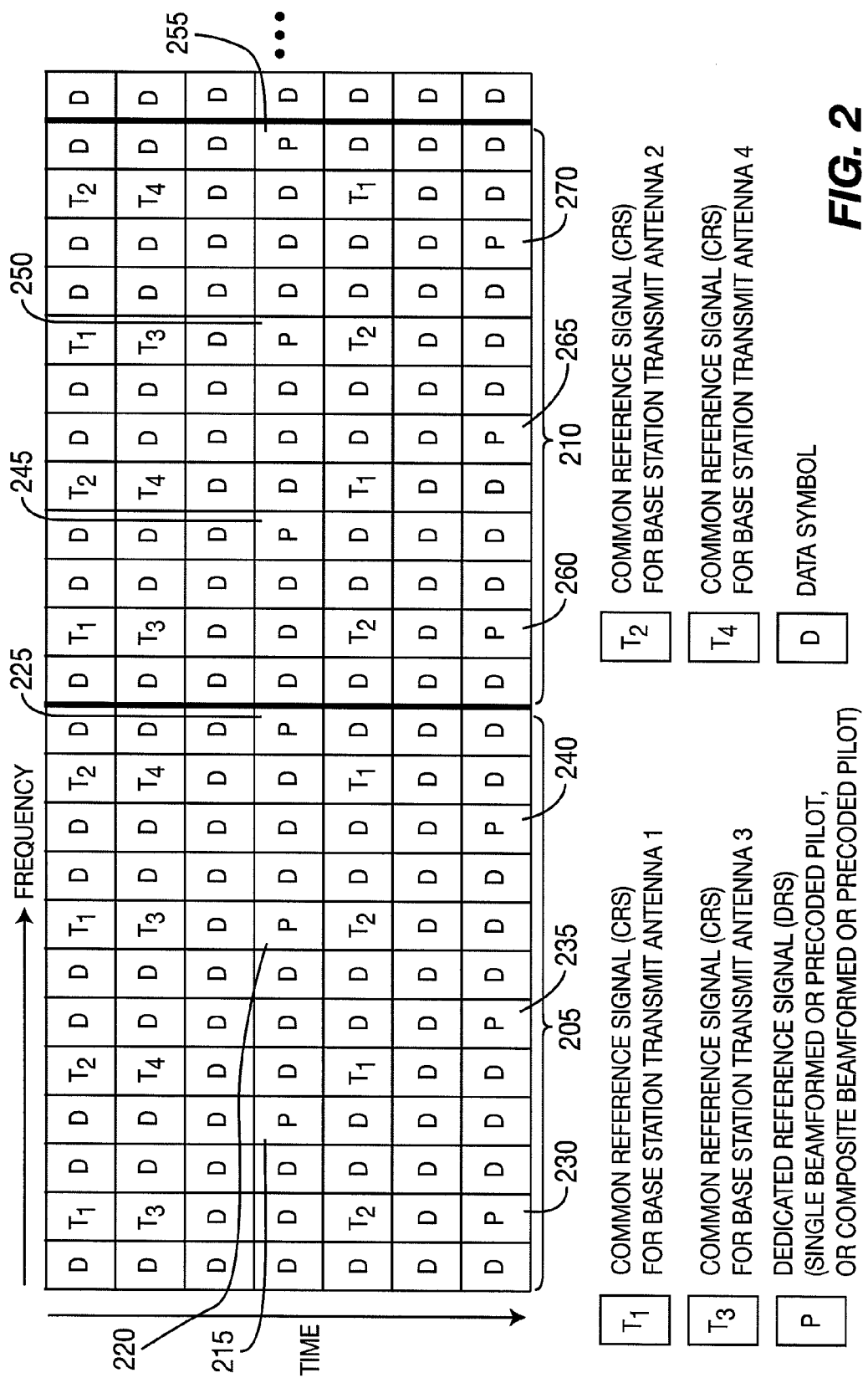
FIGS. 2-8 show various examples of RB structures transmitted by the base station in the system of FIG. 1.

FIG. 2 shows an example of an RB structure that may be transmitted by the base station 105. Each of a plurality of RBs 205 and 210 includes a plurality of REs reserved for data symbols (D), a plurality of REs reserved for CRSs associated with respective base station transmit antennas ($T_1$-$T_4$), and a plurality of REs reserved for DRSs (P), which include either a single beamformed or precoded pilot, or a composite beamformed or precoded pilot. As shown in FIG. 2, the DRSs are reserved by REs 215, 220, 225, 230, 235, 240, 245, 250, 255, 260, 265 and 270.

Figure 3:
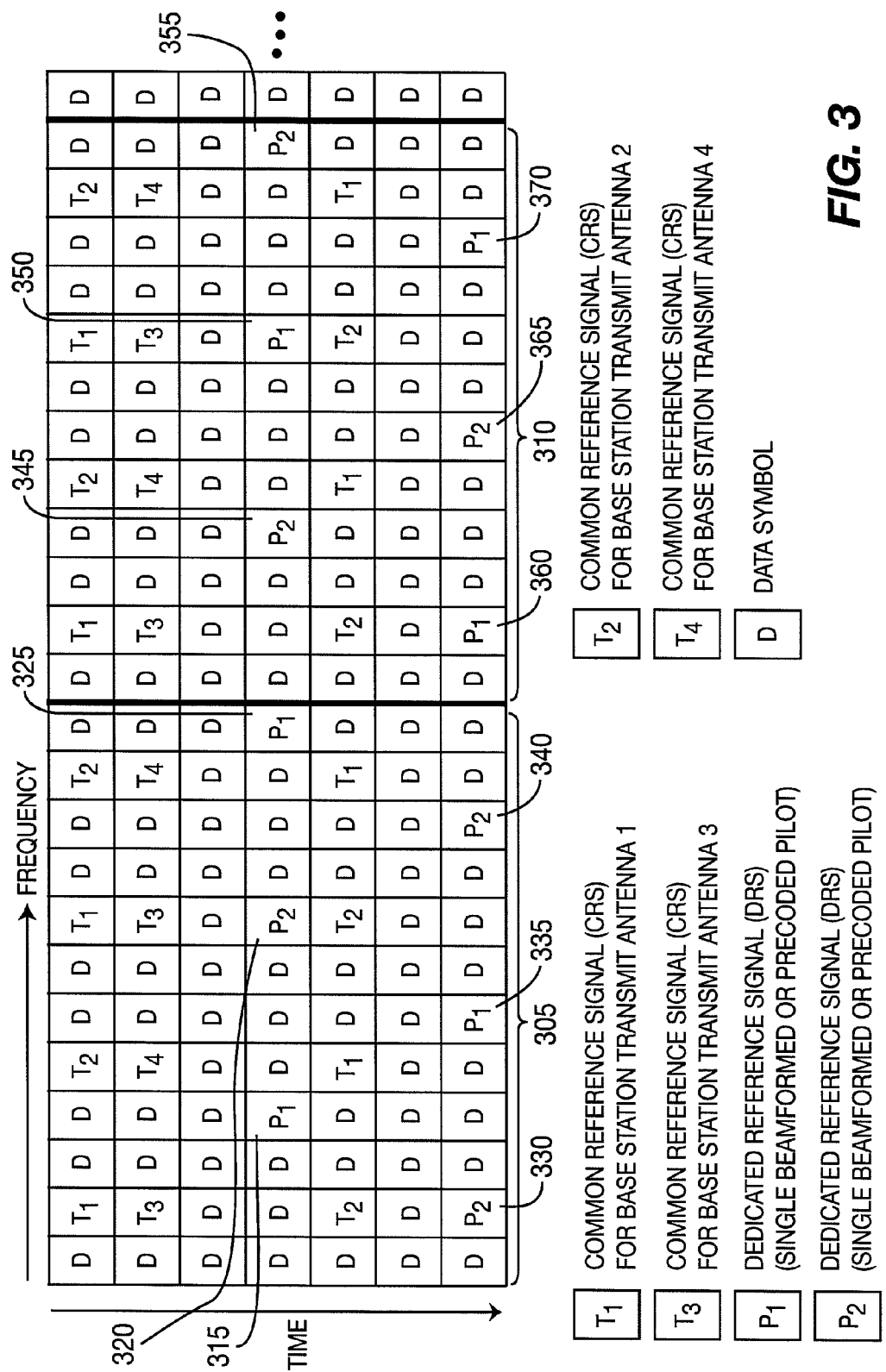

In one configuration or mode, (i.e., DRS mode 1), N DRSs include N single beamformed pilots or precoded pilots. FIG. 3 shows an example of an RB structure that may be transmitted by the base station 105 in accordance with DRS mode 1, whereby each of a plurality of RBs 305 and 310 includes a plurality of REs reserved for data symbols (D), a plurality of REs reserved for CRSs associated with respective base station transmit antennas ($T_1$-$T_4$), and a plurality of REs reserved for DRSs which include either a single beamformed or precoded pilot $P_1$, or a single beamformed or precoded pilot $P_2$. Each single beamformed or precoded pilot has a plurality of elements, each of which is transmitted by a respective transmit antenna of a MIMO antenna of the base station 105. As shown in FIG. 3, the DRSs are reserved by REs 315, 320, 325, 330, 335, 340, 345, 350, 355, 360, 365 and 370.

When DRS mode 1 is used, the effective channel response may be directly estimated by the WTRU 110 using the DRSs ($P_1$ and $P_2$). In addition, an effective channel response estimate may also be computed using a common channel and a precoding matrix obtained by precoding matrix verification via a DRS. If there are a small number of active MIMO layers, (i.e., a small number of data streams transmission, such as one or perhaps two data streams transmission,) DRS mode 1 may be used. DRS mode 1 is suitable for low to medium data rate transmission, or to increase the range of signal reception coverage.

Figure 4:
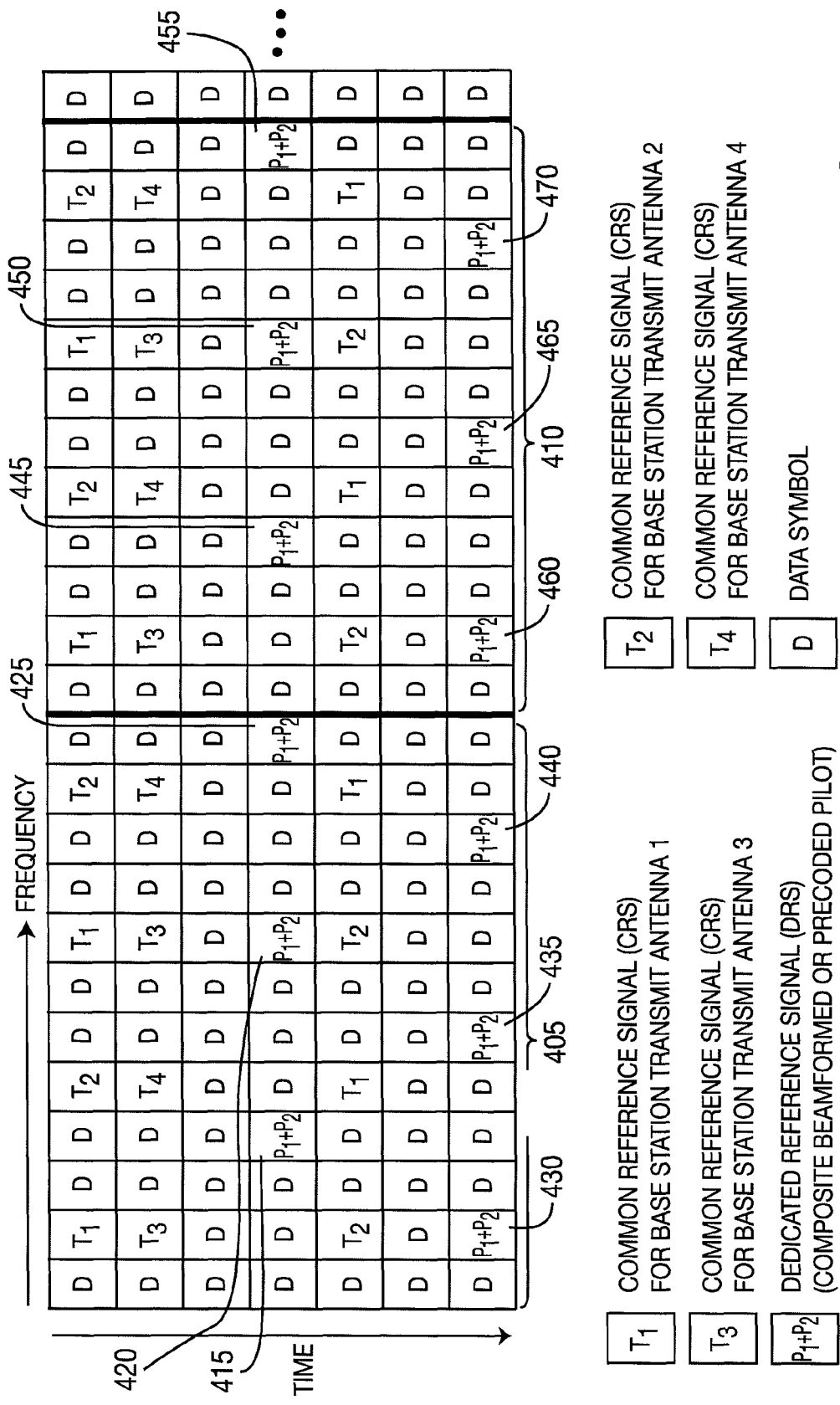

In another configuration or mode, (i.e., DRS mode 2), N DRSs include N composite beamformed or precoded pilots. FIG. 4 shows an example of an RB structure that may be transmitted by the base station 105 in accordance with DRS mode 2, whereby each of a plurality of RBs 405 and 410 includes a plurality of REs reserved for data symbols (D), a plurality of REs reserved for CRSs associated with respective base station transmit antennas ($T_1$-$T_4$), and a plurality of REs reserved for DRSs which include a composite beamformed or precoded pilot ($P_1$+$P_2$). Each composite beamformed or precoded pilot has a plurality of elements, each of which is transmitted by a respective transmit antenna of a MIMO antenna of the base station 105. As shown in FIG. 4, the DRSs are reserved by REs 415, 420, 425, 430, 435, 440, 445, 450, 455, 460, 465 and 470. In this case the effective channel response may be computed using a common channel and a precoding matrix obtained by precoding matrix verification via a DRS.

Figure 5:
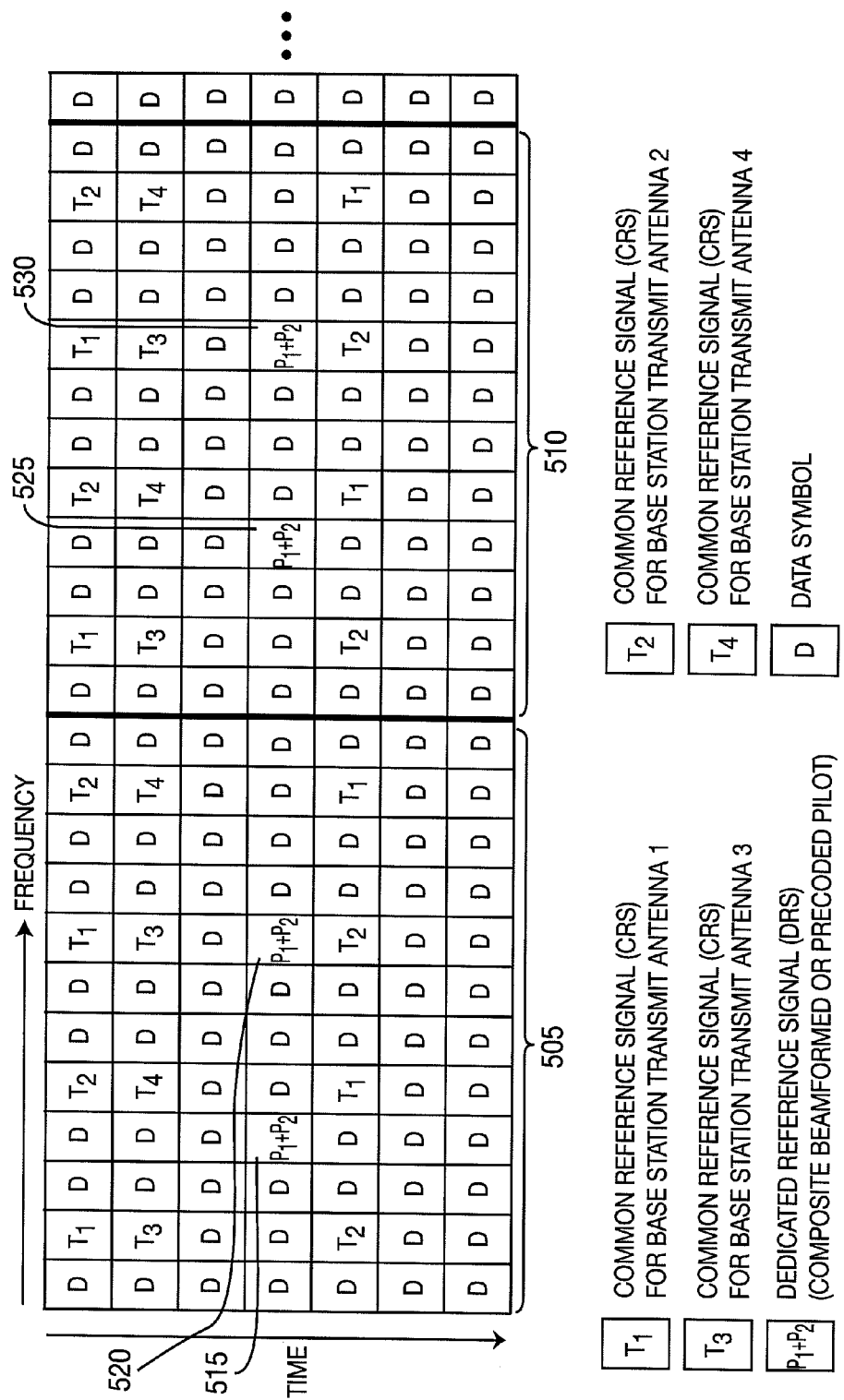

FIG. 5 shows another RB structure that also may be transmitted by the base station 105 in accordance with DRS mode 2, but having a substantially lower DRS density than the RB structure of FIG. 4, whereby an RB 505 only has two REs 515 and 520 that are reserved for DRSs which include a composite beamformed or precoded pilot ($P_1$+$P_2$), and an RB 510 only has two REs 525 and 530 that are reserved for DRSs which include a composite beamformed or precoded pilot ($P_1$+$P_2$).

The WTRU 110 may directly estimate the effective channel response using dedicated pilots. In addition, an effective channel response may also be computed using a precoding matrix obtained by precoding matrix index (PMI) verification via single beamformed or precoded pilots. If there are large number of active MIMO layers, such as two, or more than two data transmission streams, DRS mode 2 may be used. Thus, DRS mode 2 is suitable for medium to high data rate transmission.

The WTRU 110 may compute an effective channel response by multiplying common channel response estimates, obtained from common pilots or CRSs, with a precoding matrix obtained from the DRSs. A PMI verification is performed on the DRSs. More than two DRSs per RB may also be used to improve performance. However, an increased overhead cost may be incurred. Additionally, various other combinations of allocating single beamformed pilots or precoded pilots and/or composite beamformed or precoded pilots to DRSs in the RBs are also possible.

In another configuration or mode, (i.e., DRS mode 3), single beamformed or precoded pilots, and composite beamformed or precoded pilots, may coexist and be transmitted simultaneously within the same RBs or in different RBs. Thus, in accordance with DRS mode 3, the DRSs in a particular RB may include one of the following:
1) only single beamformed or precoded pilots;
2) only composite beamformed or precoded pilots; and
3) a combination of single beamformed or precoded pilots, and composite beamformed or precoded pilots.

Figure 6:
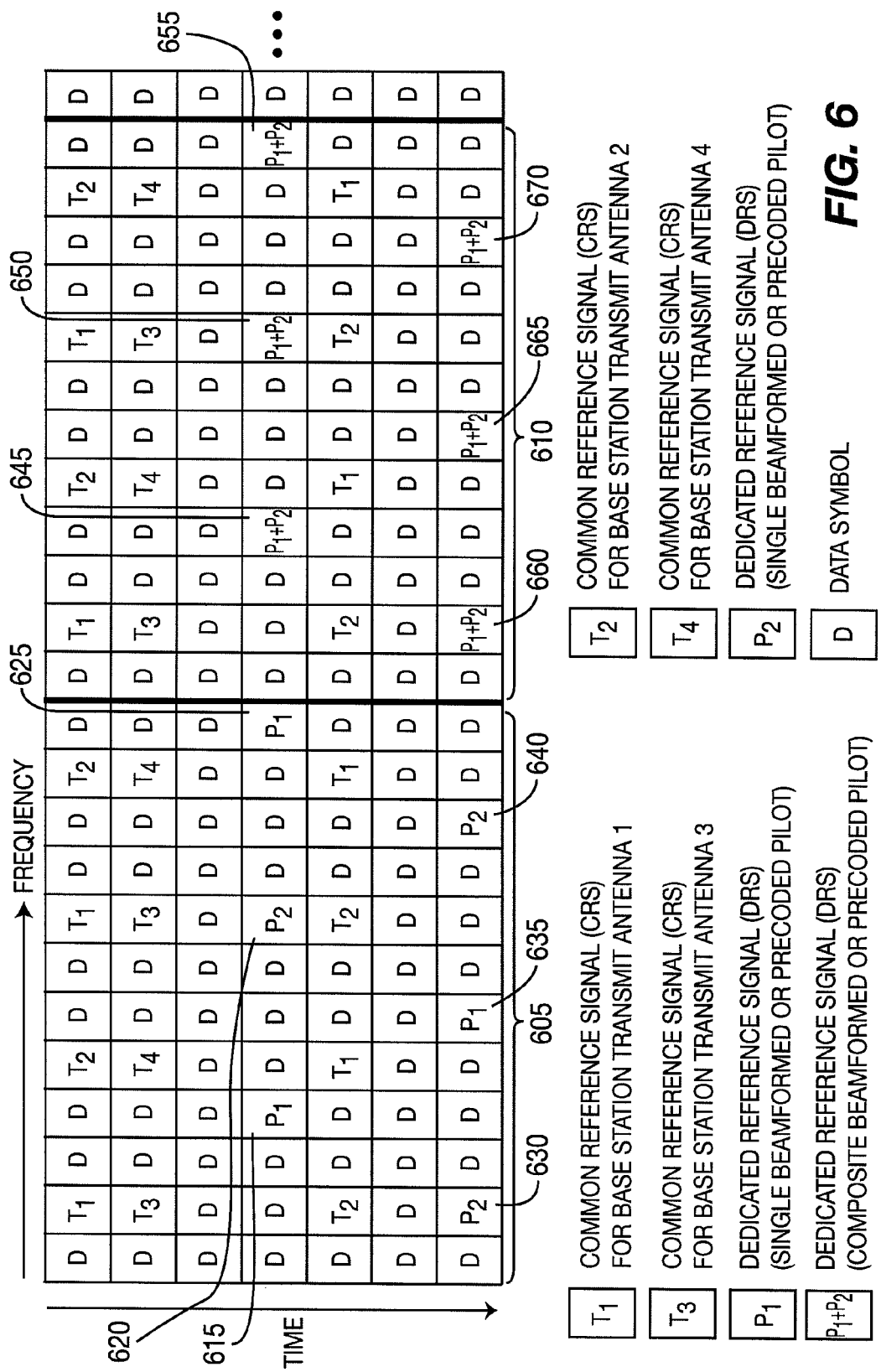

FIG. 6 shows an example of an RB structure that may be transmitted by the base station 105 in accordance with DRS mode 3, whereby a first particular RB 605 includes a plurality of REs 615, 620, 625, 630, 635 and 640 that are reserved for DRSs that only include single beamformed or precoded pilots ($P_1$ and $P_2$), and a second particular RB 610 includes a plurality of REs 645, 650, 655, 660, 665 and 670 that are reserved for DRSs that only include composite beamformed or precoded pilots ($P_1$+$P_2$).

Single beamformed or precoded pilots are included only in the DRSs in the first particular RB 605, whereby each DRS symbol carries one single beamformed or precoded pilot vector. Composite beamformed or precoded pilots are included only in the DRSs in the second particular RB 610. The composite beamformed or precoded pilots ($P_1$+$P_2$) may be generated by adding individual single beamformed or precoded pilots ($P_1$ and $P_2$) together. The single beamformed or precoded pilot vectors are added to one another, and the resulting composite beamformed or precoded pilot is transmitted in one or more DRS symbols. Thus, in the hybrid DRS configuration described above, some of the DRSs include single beamformed or precoded pilots across different RBs, and some of the DRSs include composite beamformed or precoded pilot across different RBs.

Figure 7:
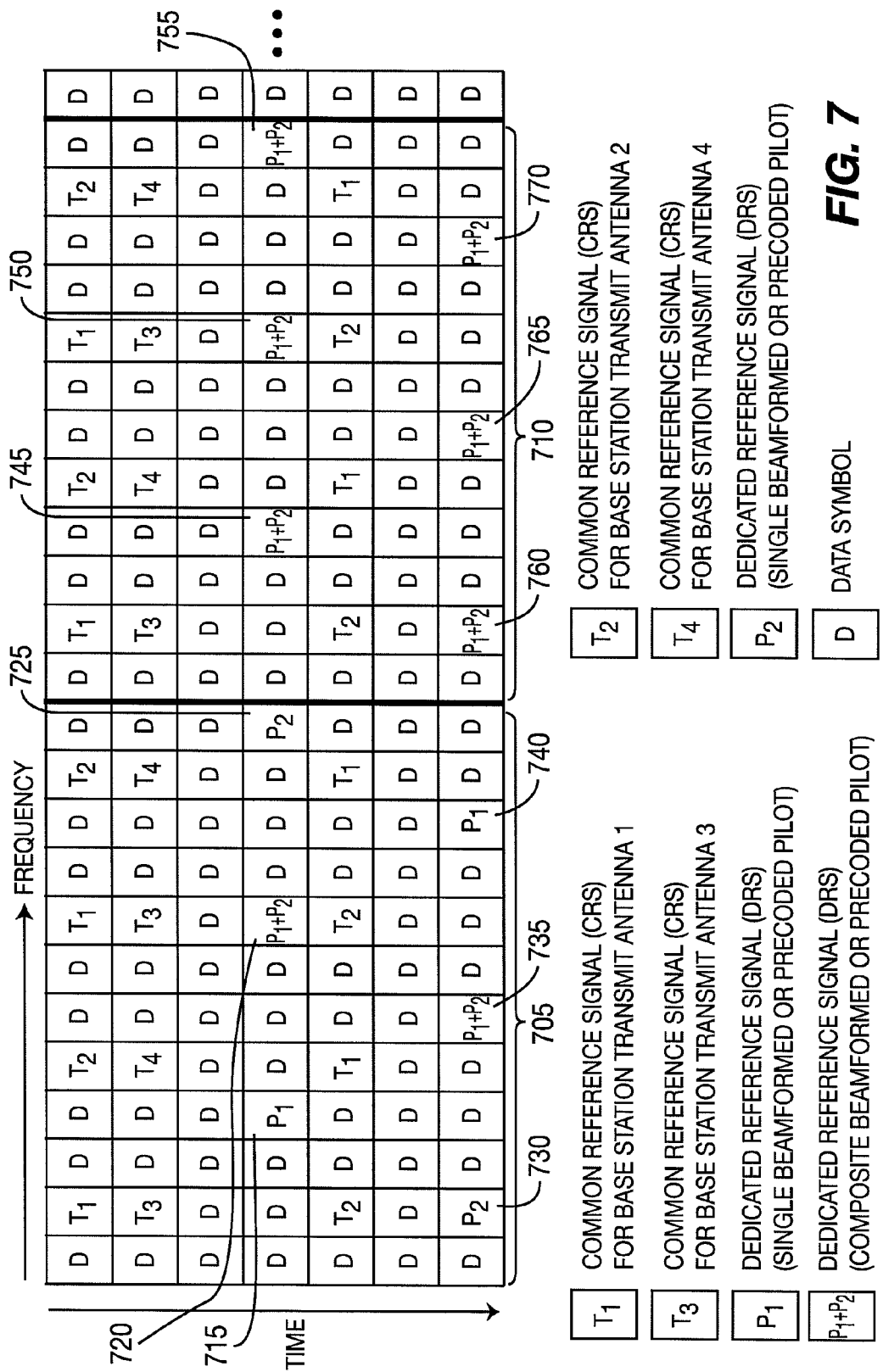

FIG. 7 shows another example of an RB structure that may be transmitted by the base station 105 in accordance with DRS mode 3. A first particular RB 705 in the RB structure of FIG. 7 includes a first group of REs 715, 725, 730 and 740 that are reserved for DRSs that only include single beamformed or precoded pilots ($P_1$ and $P_2$), and a second group of REs 720 and 735 that are reserved for DRSs that only include composite beamformed or precoded pilots ($P_1$+$P_2$). A second particular RB 710 in the RB structure of FIG. 7 only includes REs 745, 750, 755, 760, 765 and 770 that are reserved for DRSs that only include composite beamformed or precoded pilots ($P_1$+$P_2$).

Figure 8:
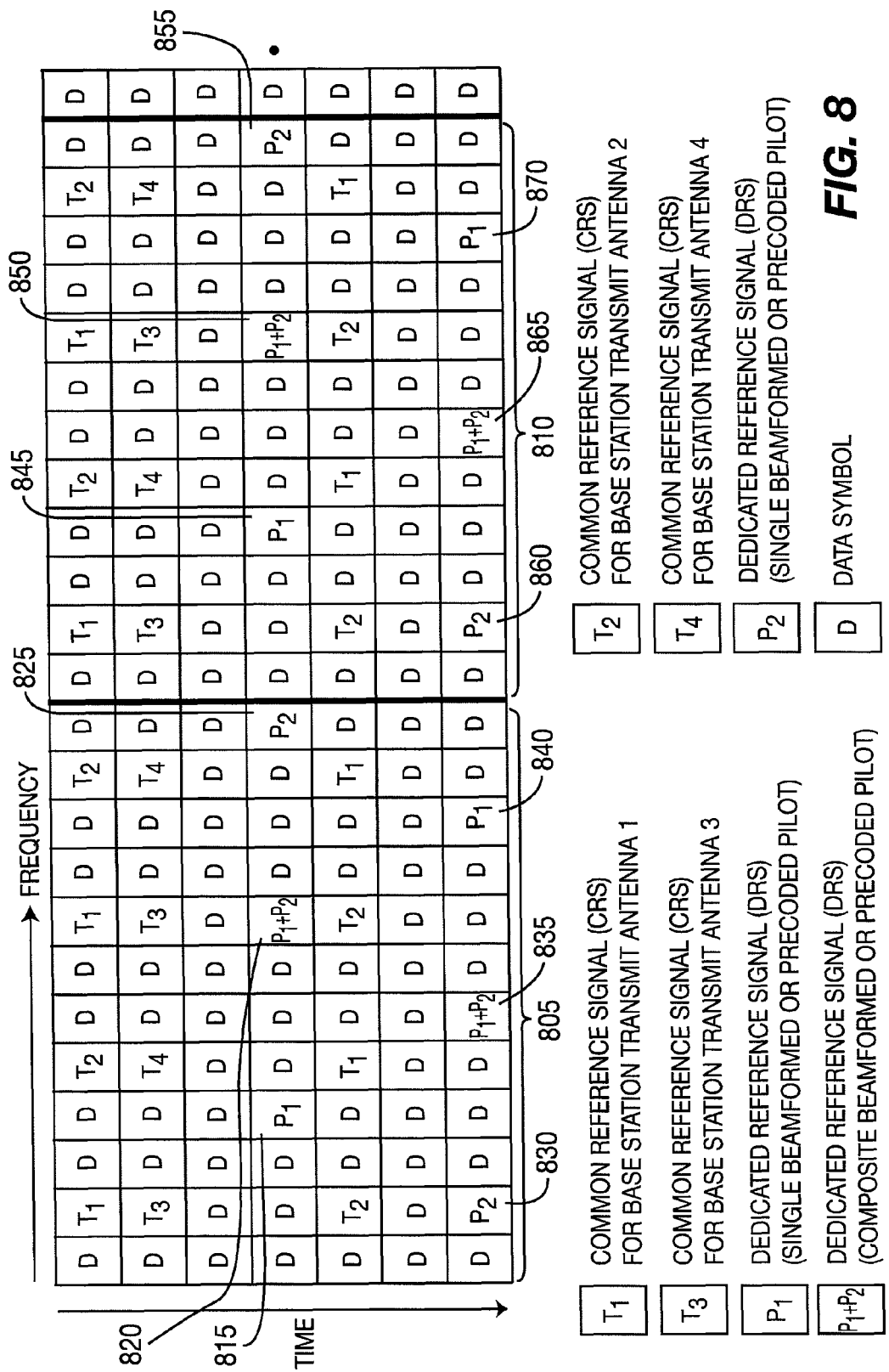

FIG. 8 shows yet another example of an RB structure that may be transmitted by the base station 105 in accordance with DRS mode 3. A first particular RB 805 in the RB structure of FIG. 8 includes a first group of REs 815, 825, 830 and 840 that are reserved for DRSs that only include single beamformed or precoded pilots ($P_1$ and $P_2$), and a second group of REs 820 and 835 that are reserved for DRSs that only include composite beamformed or precoded pilots ($P_1$+$P_2$). A second particular RB 805 in the RB structure of FIG. 8 includes a third group of REs 845, 855, 860 and 870 that are reserved for DRSs that only include single beamformed or precoded pilots ($P_1$ and $P_2$), and a fourth group of REs 850 and 865 that are reserved for DRSs that only include composite beamformed or precoded pilots ($P_1+P_2$). Each DRS symbol carries one single beamformed or precoded pilot vector, or one composite beamformed or precoded pilot vector.

Thus, FIG. 8 depicts a hybrid configuration whereby two thirds of the DRS REs in each RB 805 and 810 are single beamformed or precoded pilots and one third of DRS REs in each RB 805 and 810 are composite beamformed or precoded pilots. Other RB structure configurations are also possible by changing the ratio of DRS REs including single beamformed or precoded pilots to DRS REs including composite beamformed or precoded pilots in the same RB.

Although the RB structures depicted by FIGS. 2-8 show that each of the RBs have 84 (12×7) REs, an RB structure of any dimension may be used. Furthermore, the RE positions of the data symbols (D), CRSs ($T_1$-$T_4$), and DRSs ($P_1$, $P_2$, and $P_1+P_2$) are presented as an example only, and any other desirable configuration of the RB structure may be used. Furthermore, although only two single beamformed or precoded pilots ($P_1$ and $P_2$) are shown as examples in FIGS. 3-8 for simplicity, there could generally be more than two single beamformed or precoded pilots to support two or more data transmission streams.

The use of a single beamformed or precoded pilot may avoid incorrect detection of beamforming or precoding information, but comes at the cost of increased overhead. The use of a composite beamformed or precoded pilot may reduce overhead, but at the cost of possible incorrect beamforming or precoding information detection. A hybrid DRS scheme that combines single beamformed or precoded pilots and composite beamformed or precoded pilots can achieve an efficient trade-off between performance and overhead.

In one example, if there are M MIMO transmission layers, which indicate M single beamformed or precoded pilot vectors (i.e., independent data streams) that can be transmitted, denoted as P1, P2, P3 and P_M, and N DRSs within an RB, the N DRSs are partitioned into two different groups: group 1 and group 2. Group 1 has N1 DRSs which transmit single beamformed or precoded pilot vectors. One DRS transmits one of the M single beamformed or precoded pilot vectors. FIGS. 2-8 depict various examples of RB block structures for which a DRS symbol transmits a particular beamformed or precoded pilot vector. Group 2 has N2, (N2=N−N1), DRSs which transmit composite beamformed or precoded pilots. A composite pilot is a superposition or addition of two or more single beamformed or precoded pilot vectors. For example, a composite pilot P_c1 may be a superposition of P1 and P2, i.e., P_c1=P1+P2. Or a composite pilot P_c2 may be a superposition of all pilot vectors such that P_c2= P1+P2+ . . . +P_M. A composite pilot P_c may be any proper number of single beamformed or precoded pilot vectors, and any combinations of them. For example, for a composite pilot (P_c1) with two single beamformed or precoded pilot vectors that are superpositioned, the composite pilot vector may be P1+P2, P1+P3, P1+P_M, P2+P1, and the like.

Referring back to FIG. 1, if the system 100 is a two mode system capable of only operating in accordance with DRS mode 1 and DRS mode 2, the DRS mode indicators in the "control type" data symbols of the RBs transmitted by the base station 105 may indicate to the WTRU 110 which one of the two modes the system 100 is currently operating in. For the DRS mode 1, the RBs transmitted by the base station 105 only include DRSs including single beamformed or precoded pilots. For DRS mode 2, the RBs transmitted by the base station 105 only include DRSs including composite beamformed or precoded pilots. A one bit DRS mode indicator in "control type" data symbols of the RBs may be used to instruct the WTRU 110 to switch between DRS mode 1 and DRS mode 2.

It is also possible to have a DRS mode 0 in which there are no REs reserved for DRS. Referring back to FIG. 1, if the system 100 is a two mode system capable of only operating in accordance with DRS mode 0, (no REs reserved for DRS), and DRS mode 1, (REs reserved for DRSs including single beamformed or precoded pilots), the DRS mode indicators in the "control type" data symbols of the RBs transmitted by the base station 105 may indicate to the WTRU 110 which one of the two modes the system 100 is currently operating in. For the DRS mode 1, the RBs transmitted by the base station 105 only include DRSs including single beamformed or precoded pilots. For DRS mode 0, the RBs transmitted by the base station 105 include no DRSs, and thus do not include single or composite beamformed or precoded pilots. A one bit DRS mode indicator in "control type" data symbols of the RBs may be used to instruct the WTRU 110 to switch between DRS mode 1 and DRS mode 0. "Control type" data symbols may carry either higher layer signaling, (e.g., layer 2 (L2)/layer 3 (L3) signaling), or lower layer signaling, (e.g., layer 1 (L1) signaling).

Still referring to FIG. 1, if the system 100 is a four mode system capable of operating in accordance with DRS mode 1, DRS mode 2, DRS mode 3 and DRS mode 0, the DRS mode indicator, (having more than 1 bit), may indicate which DRS mode and/or configuration the WTRU 110 should operate in.

DRS mode indicator signaling may be communicated via higher layer signaling, (e.g., L2/L3 signaling), using "bits" which are carried by REs reserved for data in the RBs. It is also possible to communicate DRS mode indicator signaling to users via lower layer signaling, (e.g., L1 signaling).

A DRS mode 1 and mode 2 may be combined to create additional DRS operation modes. DRS mode 3 may be defined in such way that the first half of the DRSs are used for single beamformed or precoded pilot transmission and the second half of DRSs are used for composite beamformed or precoded pilot transmission. Furthermore, depending on the partitioning, (e.g., which and how many DRSs), and the layout of the DRS types, (i.e., DRSs including a single beamformed or precoded pilot, and DRSs including a composite beamformed or precoded pilot), additional DRS modes may be created. For systems using three or four modes, two bits may be used in the DRS indicator. For systems using more than four modes, Y bits may be used, where Y>2.

DRS mode 1 including single beamformed or precoded pilots is suitable for non-codebook based beamforming or precoding. DRS mode 2 including composite beamformed or precoded pilots is suitable for codebook based beamforming or precoding. DRS mode 3 including hybrid single and composite beamformed or precoded pilots is suitable for both non-codebook and codebook based beamforming or precoding coexisting in the same system.

Figure 9:
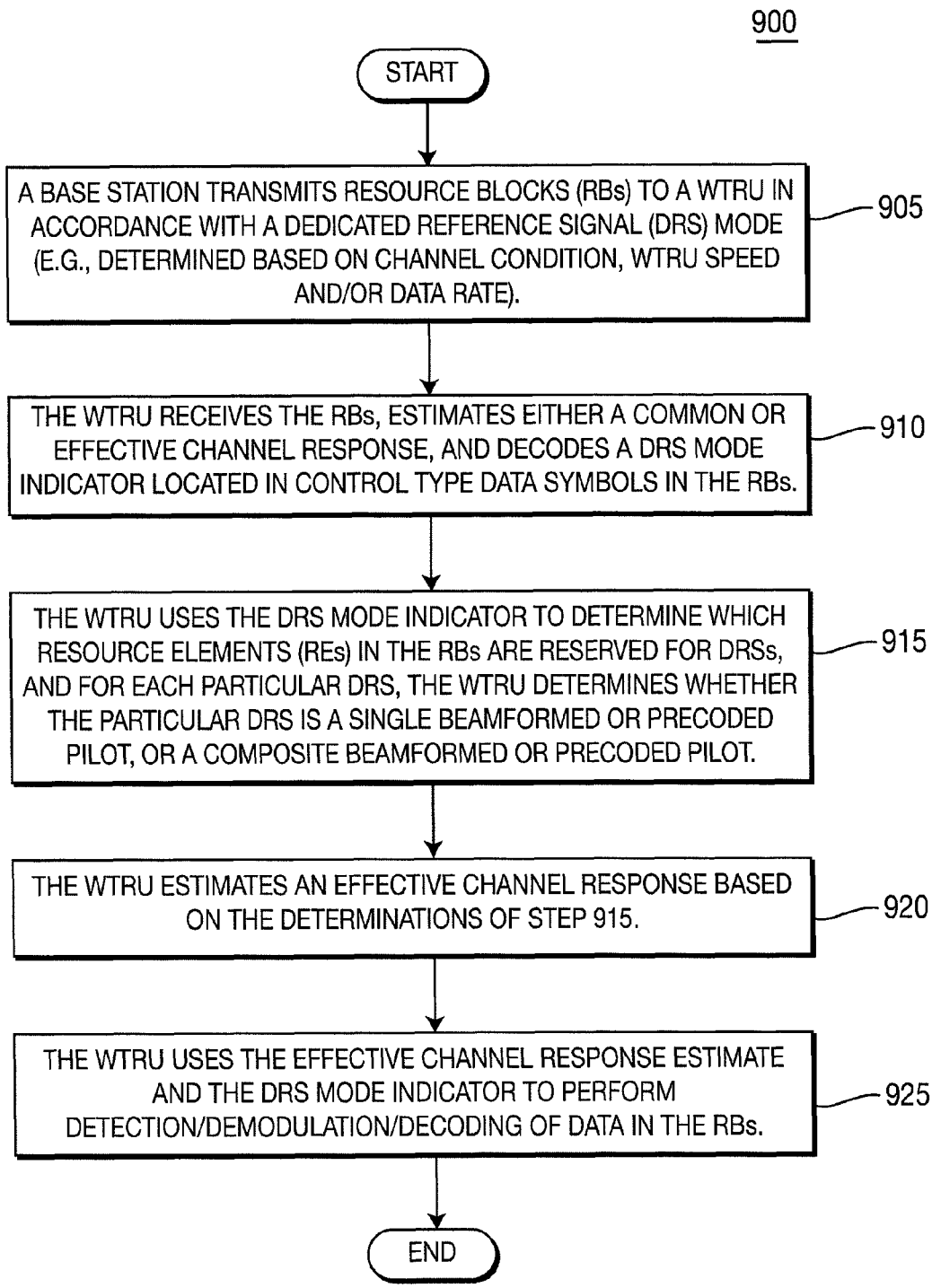
FIG. 9 is a flow diagram of a procedure of generating an effective channel response estimate used by the WTRU in the system of FIG. 1 to detect/demodulate data in RB structures transmitted by the base station in the system of FIG. 1.

FIG. 9 is a flow diagram of a procedure 900, implemented in the system 100 of FIG. 1, of generating an effective channel response estimate used by the WTRU 110 to detect/demodulate data in RB structures transmitted by the base station 105. In step 905, the base station 105 transmits RBs to the WTRU 110 in accordance with a DRS mode determined based on, but not limited to, a channel condition, WTRU speed and/or a data rate. In step 910, the WTRU 110 receives the RBs, estimates either a common or effective channel response, and decodes a DRS mode indicator located in "control type" data symbols in the RBs. The "control type" data symbols either represent higher layer signaling (e.g., layer 2/3 signaling) or lower layer signaling, (e.g., layer 1 signaling). In step 915, the WTRU 110 uses the DRS mode indicator to determine which REs in the RBs 125 are reserved for DRSs, and for each particular DRS, the WTRU 110 determines whether the particular DRS is a single beamformed or precoded pilot, or a composite beamformed or precoded pilot. In step 920, the WTRU 110 estimates an effective channel response based on the determinations of step 915. Finally, in step 925, the WTRU uses the effective channel response estimate to perform detection/demodulation/decoding of data in the RBs 125 transmitted by the base station 105.

The estimation of an effective channel response may be improved using both single beamformed or precoded pilots, and composite beamformed or precoded pilots. The effective channel response may be obtained (either directly or indirectly) from single beamformed or precoded pilots. The estimates of effective channel responses can be improved if both direct and indirect estimates from single beamformed or precoded pilots are combined. In the case when the effective channel response may also be obtained from composite beamformed or precoded pilots, the estimates of effective channel responses can be further improved if estimates from both single and composite beamformed or precoded pilots are combined.

In a two MIMO layer example, the effective channel response of each MIMO layer is estimated using a beamformed or precoded pilot. H_eff_d is denoted as the effective channel matrix obtained from direct estimation. The beamforming or precoding vector index (PVI) of each layer is obtained via PVI validation. The effective channel response of each layer is computed by multiplying a common channel response estimate with each PVI. H_eff_c is denoted as the effective channel matrix obtained from computation. H_eff_d and H_eff_c may then be averaged or combined, and weight coefficients may be applied to H_eff_d and H_eff_c when combining such that H_eff=w1×H_eff_d+w2×H_eff_c where w1 and w2 are combining weights.

Figure 10:
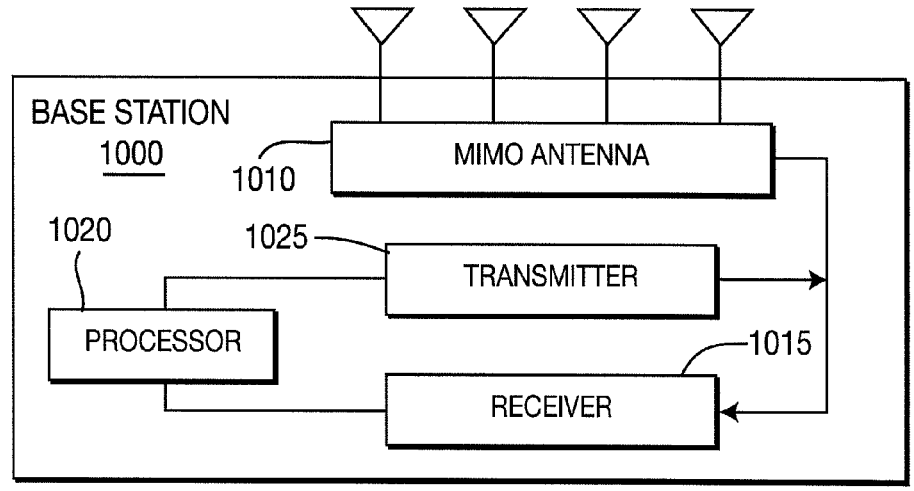
FIG. 10 is a block diagram of the base station in the system of FIG. 1.

FIG. 10 is a block diagram of a base station 1000 that is configured to transmit RBs, in accordance with a particular DRS mode. The base station 1000 may include a MIMO antenna 1010, a receiver 1015, a processor 1020 and a transmitter 1025. The MIMO antenna 1010 comprises a plurality of transmit antennas. The processor 1020 determines whether the transmitter should transmit the RBs in accordance with DRS mode 0, DRS mode 1, DRS mode 2 or DRS mode 3, which is selected based on channel conditions determined by the receiver 1015, the speed of a WTRU and/or a data rate. The processor 1020 generates RBs in accordance with the selected DRS mode, whereby the RBs include "control type" data symbols including at least one DRS mode indicator bit. The RBs are transmitted by the transmitter 1025 via the transmit antennas of the MIMO antenna 1010.

The transmitter 1025 may be configured to transmit a plurality of RBs via the MIMO antenna 1010. Each RB comprises a plurality of REs. Each RE may be reserved for one of a CRS, a DRS including a single pilot, a DRS including a composite pilot, and a data symbol. The processor 1020 may be configured to determine a particular RB structure for the RBs. Each RB may include at least one "control type" data symbol having at least one DRS mode indicator bit which indicates the particular RB structure, as determined by the processor 1020.

The processor 1020 may be configured to switch from one particular RB structure to another RB structure in response to detecting a change in at least one of a channel condition, a speed of a WTRU and a data rate. For example, the processor 1020 may be configured to switch the structure of the RBs from a first configuration in which a subset of the plurality of REs in each RB is reserved for DRSs including single beamformed or precoded pilots, (i.e., DRS mode 1), to a second configuration in which no REs are reserved for DRSs, (i.e., DRS mode 0). Alternatively, the processor 1020 may be configured to switch the structure of the RBs from a first configuration in which no REs are reserved for DRSs, (i.e., DRS mode 0), to a second configuration in which a subset of the plurality of REs in each RB is reserved for DRSs including single beamformed or precoded pilots, (i.e., DRS mode 1).

Figure 11:
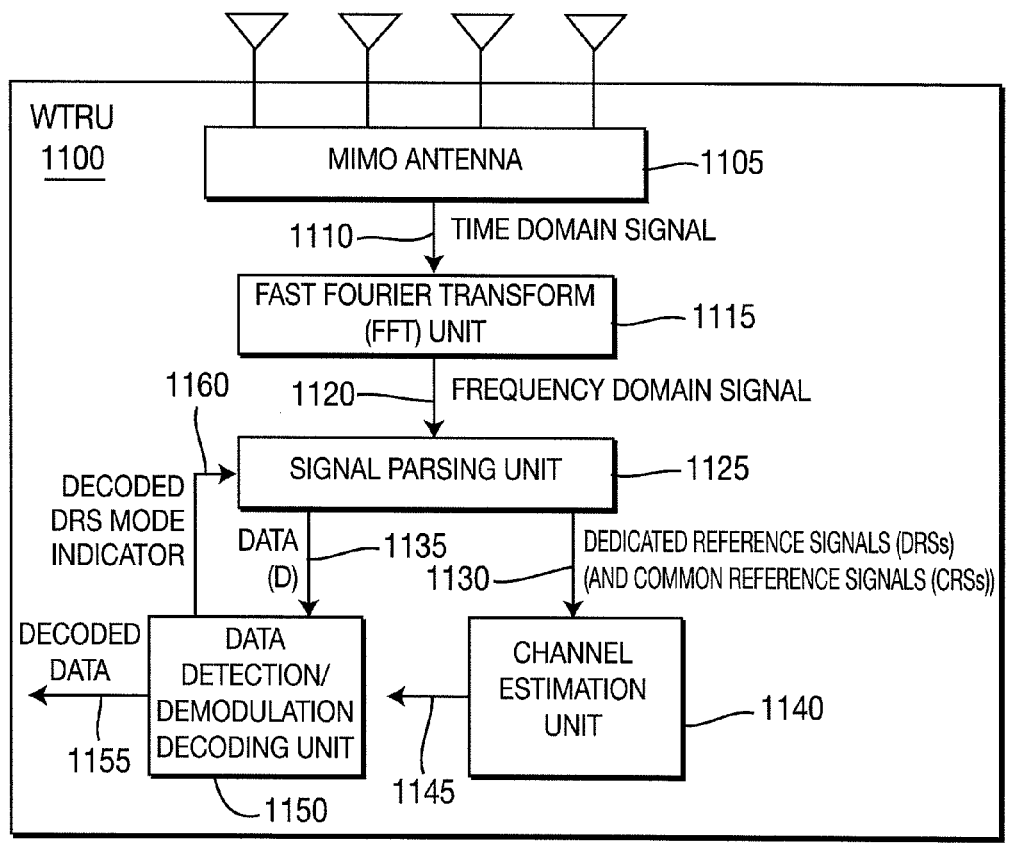
FIGS. 11 and 12 are block diagrams of the WTRU in the system of FIG. 1.

FIG. 11 is a block diagram of a WTRU 1100 configured to receive the RBs transmitted by the base station 1000 of FIG. 10, and detect/demodulate/decode data in the RBs based on a particular DRS mode indicated by the at least one DRS mode indicator bit. The WTRU 1100 may include a MIMO antenna 1105, a fast Fourier transform (FFT) unit 1115, a signal parsing unit 1125, a channel estimation unit 1140 and a data detection/demodulation/decoding unit 1150. The MIMO antenna 1105 comprises a plurality of receive antennas, and the FFT unit 1115 comprises a plurality of FFT subassemblies corresponding to respective ones of the receive antennas of the MIMO antenna 1105. The MIMO antenna 1105 receives RBs transmitted by the base station 1000 of FIG. 10 and forwards a corresponding time domain signal 1110 to the FFT unit 1115, which converts the time domain signal 1110 to a frequency domain signal 1120. The signal parsing unit 1125 parses the frequency domain signal 1120 into the DRSs/CRSs 1130 of the RBs and data (D) 1135 of the RBs. The signal parsing unit 1125 forwards the DRSs/CRSs 1130 to the channel estimation unit 1140, and forwards the data (D) 1140 to the data detection/demodulation/decoding unit 1150, which decodes "control type" data symbols in the data (D) that includes at least one DRS mode indicator bit.

The signal parsing unit 1125 parses the frequency domain signal 1120 based on a decoded DRS mode indicator signal 1160 generated by the data detection/demodulation/decoding unit 1150. The WTRU 1100 receiver and its signal parsing unit 1125 are configured in accordance with a particular DRS mode indicated by the decoded DRS mode indicator signal 1160. The decoded DRS mode indicator signal 1160 instructs the WTRU 1100 receiver and the signal parsing unit 1125 to forward the DRSs/CRSs 1130 to the channel estimation unit 1140, and to forward the data (D) 1140 to the data detection/demodulation/decoding unit 1150 based on the RB structure, (i.e., DRSs/CRSs/Ds layout), indicated by the decoded DRS mode.

If "control type" data symbols are sent via lower layer signaling, (e.g., L1 signaling), the channel estimation unit 1140 estimates the common channel response based on the CRSs and forwards common channel response estimation information 1145 to the data detection/demodulation/decoding unit 1150, which decodes the "control type" data (D) 1135 that contains the DRS mode indicator based on the common channel response estimation information 1145. Based on the decoded DRS mode indicator, the signal parsing unit 1125 forwards the DRSs/CRSs 1130 to the channel estimation unit 1140, and forwards the data (D) 1140 to the data detection/demodulation/decoding unit 1150. The channel estimation unit 1140 estimates the effective channel response based on the DRSs and forwards common channel response estimation information 1145 to the data detection/demodulation/decoding unit 1150, which decodes the "data type" data (D) 1135 based on the common channel response estimation information 1145.

If "control type" data symbols are sent via higher layer signaling, (e.g., L2/3 signaling), the channel estimation unit 1140 estimates the common and/or effective channel response, (depending on the current DRS mode), based on the CRSs and/or DRSs and forwards effective channel response estimation information 1145 to the data detection/demodulation/decoding unit 1150, which decodes the "control type" data (D) 1135 that contains a DRS mode indicator based on the effective channel response estimation information 1145. The decoded DRS indicator is used to configure and switch the DRS mode of the WTRU 1100, which will be used for subsequent transmission and receiving. For current transmission, the WTRU 1100 uses the decoded DRS mode indicator in the previous transmission and receiving.

Figure 12:
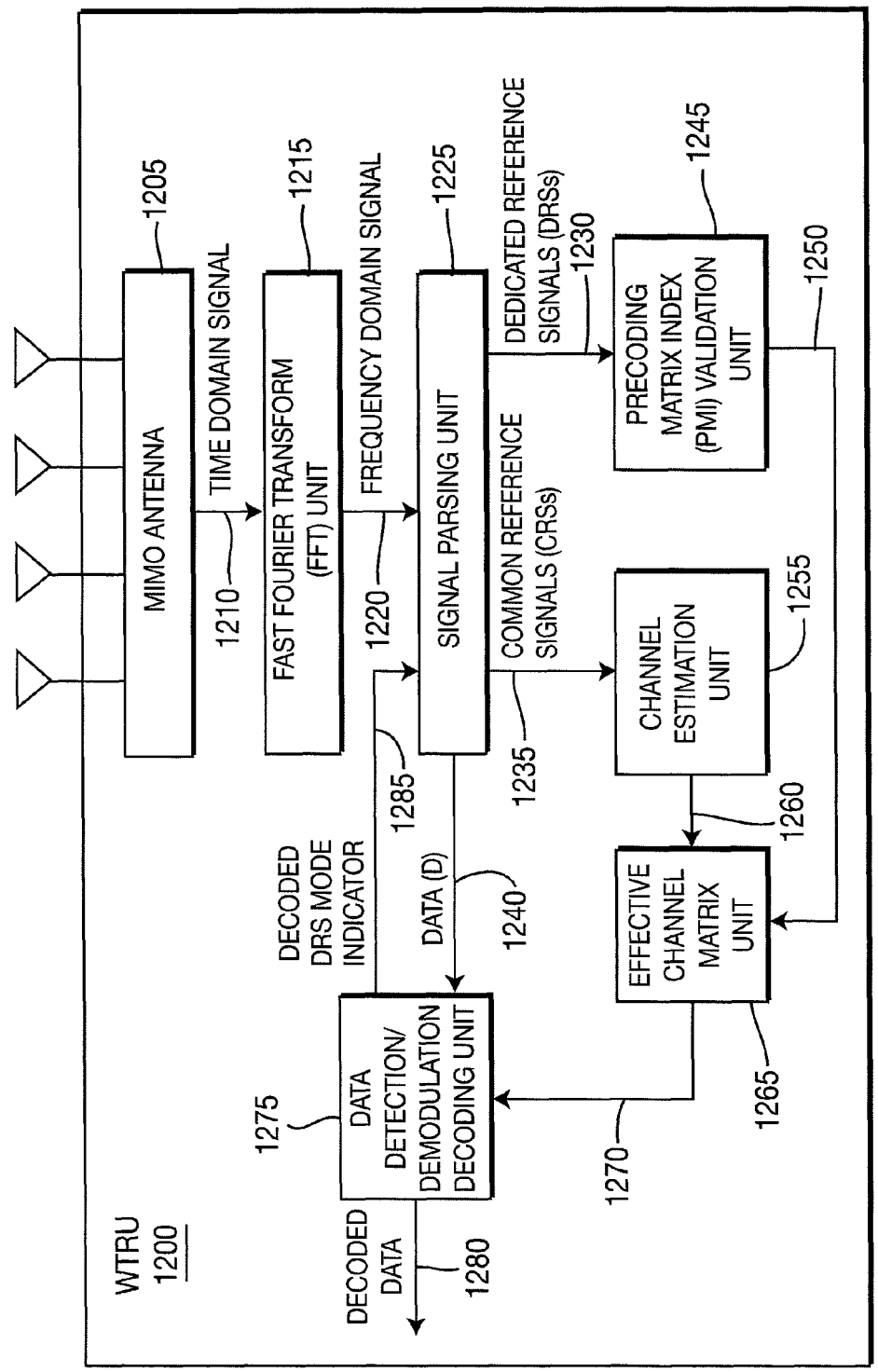

FIG. 12 is a block diagram of another WTRU 1200 configured to receive the RBs transmitted by the base station 1000 of FIG. 10, and detect/demodulate/decode data in the RBs based on a particular DRS mode indicated by the at least one DRS mode indicator bit. The WTRU 1200 may include a MIMO antenna 1205, a fast Fourier transform (FFT) unit 1215, a signal parsing unit 1225, a beamforming or precoding matrix index (PMI) validation unit 1245, a channel estimation unit 1255, an effective channel matrix unit 1265, and a data detection/demodulation/decoding unit 1275. The MIMO antenna 1205 comprises a plurality of receive antennas, and the FFT unit 1215 comprises a plurality of FFT subassemblies corresponding to respective ones of the receive antennas of the MIMO antenna 1205. The MIMO antenna 1205 receives RBs transmitted by the base station 1000 of FIG. 10 and forwards a corresponding time domain signal 1210 to the FFT unit 1215, which converts the time domain signal 1210 to a frequency domain signal 1220. If the DRS mode indicator is sent via higher layer signaling, (e.g., L2/3 signaling), the WTRU 1200 is configured and switched to the DRS mode based on the previous received and decoded DRS mode indicator. The signal parsing unit 1225 parses the frequency domain signal 1220 into the DRSs 1230, the CRSs 1235 and data (D) 1240 of the RBs. The signal parsing unit 1225 forwards the DRSs 1230 to the PMI validation unit 1245, forwards the CRSs 1235 to the channel estimation unit 1255, and forwards the data (D) 1240 to the data detection/demodulation/decoding unit 1275, which decodes data symbols in the data (D). The data detection/demodulation/decoding unit 1275 will decode "control type" data symbols in the data (D) that contains at least one DRS mode indicator bit, if the DRS mode indicator is sent via lower layer signaling (e.g., L1 signaling). The beamforming or PMI validation unit 1245 forwards a PMI validation signal 1250 to the effective channel matrix unit 1265. The channel estimation unit 1255 estimates the common channel response based on the CRSs 1235 and forwards common channel response estimation information 1260 to the effective channel matrix unit 1265, which generates an effective channel matrix information signal 1270. The effective channel matrix unit 1265 forwards the effective channel matrix information signal 1270 to the data detection/demodulation/decoding unit 1275, which decodes the data (D) 1240 based on the effective channel matrix information signal 1270 to generate decoded data 1280.

The signal parsing unit 1225 parses the frequency domain signal 1220 based on a decoded DRS mode indicator signal 1285 generated by the data detection/demodulation/decoding unit 1275. The WTRU 1200 receiver and its signal parsing unit 1225 are configured in accordance with a particular DRS mode indicated by the decoded DRS mode indicator signal 1285. The decoded DRS mode indicator signal 1285 instructs the WTRU 1200 receiver and the signal parsing unit 1225 to forward the CRSs 1235 to the channel estimation unit 1255, to forward the DRSs 1230 to the PMI validation unit 1245, and to forward the data (D) 1240 to the data detection/demodulation/decoding unit 1275 based on the RB structure, (i.e., DRSs/CRSs/Ds layout), indicated by the decoded DRS mode indicator signal 1285.

The PMI validation unit 1245 performs blind detection for the beamforming or precoding information that is used at the base station 1000. The algorithm for such a blind detection searches through a beamforming or precoding codebook for the best beamforming or precoding information based on a certain criteria, such as "minimum distance" of signal or "maximum likelihood" of detection (see Equations (5) and (6)).

In the beamformed or precoded pilot method, each dedicated pilot (P_m) transmits one beamformed or precoded pilot via all antennas. For example, if there are four antennas having two data streams each, a dedicated pilot m=1, 2 transmits the following precoded pilot:

$$P_m = \begin{bmatrix} v_{m1} \\ v_{m2} \\ v_{m3} \\ v_{m4} \end{bmatrix} \cdot C_m,$$

where $[v\_m1, \ldots, v\_m4]^T$ is the precoding vector of the m-th stream and $C\_m$ is a pilot code or sequence. For M data streams, M dedicated pilots are required and M precoded pilots are transmitted by M dedicated pilots, each in different subcarriers.

The channel is estimated via each dedicated pilot across all antennas. For example, if there are four antennas and two streams, the received signal model for each dedicated pilot m=1, 2 is:

$$\vec{y}_m = \begin{bmatrix} h_{11} & h_{12} & h_{13} & h_{14} \\ h_{21} & h_{22} & h_{23} & h_{24} \end{bmatrix} \begin{bmatrix} v_{m1} \\ v_{m2} \\ v_{m3} \\ v_{m4} \end{bmatrix} \cdot C_m + \vec{n}. \qquad \text{Equation (1)}$$

The effective channel matrix is:

$$H_{\mathit{eff}} = \begin{bmatrix} h_{\mathit{eff},11} & h_{\mathit{eff},12} \\ h_{\mathit{eff},21} & h_{\mathit{eff},22} \end{bmatrix}. \qquad \text{Equation (2)}$$

The effective channel response can be estimated using two dedicated pilots as an example as follows:

$$\vec{y}_1 = \begin{bmatrix} h_{\mathit{eff},11} \\ h_{\mathit{eff},21} \end{bmatrix} \cdot C_1 + \vec{n}; \qquad \text{Equation (3)}$$

and $$\vec{y}_2 = \begin{bmatrix} h_{\mathit{eff},12} \\ h_{\mathit{eff},22} \end{bmatrix} \cdot C_2 + \vec{n}. \qquad \text{Equation (4)}$$

The effective channel responses may be estimated using both common and dedicated pilots. Channel H may be obtained from a common pilot, T_m. The effective channel responses may be computed using multiplication of H and V, i.e., H_eff=HV, where V is the beamforming or precoding vector or matrix. The effective channel response H_eff may be obtained from dedicated pilot P_m (=V*C_m) by performing channel estimation algorithm for Equations (3) and (4).

When decoding the beamforming or precoding matrices/vectors, beamforming or precoding vectors can be detected using the following algorithms for each of the M beamformed or precoded pilots, m=1, 2, ... M:

$$\hat{V}_m = \underset{V_i}{\mathrm{argmin}} \|y_m - H_m V_i C_m\|. \quad \text{Equation (5)}$$

Once the beamforming or precoding matrix or vector is obtained, the effective channel response can be computed by H_eff=H×V_hat where H is common channel response and V_hat is the detected beamforming or precoding matrix or vector. The effective channel response may also be estimated above for each of the M beamformed or precoded pilots, m=1, 2, ... M.

A beamforming or precoding matrix or vectors may be detected using the following algorithms for M beamformed or precoded pilots:

$$\hat{V} = \underset{V_i}{\mathrm{argmin}} \left( \sum_{m=1}^{M} \|y_m - H_m V_i C_m\| \right), \quad \text{Equation (6)}$$

where V_hat is the detected beamforming or precoding matrix or vectors.

The effective channel response H_eff may be obtained from composite beamformed or precoded pilots or composite dedicated pilot. The beamforming or precoding matrices or vectors can be detected using M composite beamformed or precoded pilots:

$$\hat{V} = \underset{\{V_i\}}{\mathrm{argmin}} \left( \sum_{m=1}^{M} \left\| y_m - \sum_{V_i \in \{V_i\}} H_m V_i C_m \right\| \right), \quad \text{Equation (7)}$$

where {Vi} is a set of V. For example {Vi} can be {V1, V2} or {V1, V3} or {V1, V2, V3}, {V1, V2, V3, V4}, and the like.

Combining the estimates of effective channel responses from both common and dedicated pilots or composite dedicated pilots, the performance of channel response estimation and data detection may be improved. Alternatively, one may reduce the number of deployed dedicated pilots or composite dedicated pilots for the same performance.

Examples of one MIMO layer, two MIMO layer, and three or more MIMO layers are as follows:

One Layer:
1) Obtain H_eff_d→Use H_eff_d. (see Equations (3) and (4).) Subscript d means H_eff can be obtained by direct estimation. Same for the following.
or
2) Detect PVI→compute and use H_eff_c. (obtained from Equations (5) and (6).) Subscript c means H_eff is obtained by computation. The same applies for the following.
or
3) Obtain H_eff_d, detect PVI and compute H_eff_c. Average or combine H_eff_d and H_eff_c.

Two MIMO Layers:
1) Obtain h_eff_d1 and h_eff_d2, H_eff_d=[heff_d1 h_eff_d2].
2) Obtain PVI1, PVI2→compute h_eff_c1 and h_eff_c2, H_eff_c=[h_eff_c1 h_eff_c2].
3) Average or combine H_eff_d and H_eff_c.

Three or More MIMO Layers:
1) Obtain PMI→compute H_eff_c.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

The invention claimed is:

1. A wireless communication method of detecting data in resource blocks (RBs), the method comprising:
receiving a plurality of RBs, each RB comprising a plurality of resource elements (REs), wherein the plurality of resource elements comprise at least one common reference signal (CRS) for a plurality of wireless transmit/receive units (WTRUs), at least one dedicated reference signal (DRS) specific to a single WTRU, and at least one data symbol;
determining which of the REs include the at least one CRS;
determining which of the REs include the at least one DRS based on a DRS mode indicator signaled by way of at least one control-type data symbol, wherein the DRS mode indicator indicates any of first and second DRS modes, wherein the first DRS mode indicates the at least one DRS comprises a respective at least one single beamformed or precoded pilot, and wherein the second DRS mode indicates the at least one DRS comprises a respective at least one composite beamformed or precoded pilot;
estimating an effective channel response; and detecting data in the at least one data symbol based on the effective channel estimate response.

2. The method of claim 1, wherein the at least one DRS comprises a single beamformed or precoded pilot.

3. The method of claim 2, wherein the at least one CRS does not include a beamformed or precoded pilot.

4. The method of claim 3 wherein each of the RBs comprises at least one "control type" data symbol that includes at least one DRS mode indicator bit that indicates a particular DRS mode associated with the RB.

5. The method of claim 4 wherein the particular DRS mode is associated with an RB structure in which each DRS includes a single beamformed or precoded pilot.

6. The method of claim 4 wherein the particular DRS mode is associated with an RB structure in which each DRS includes a composite beamformed or precoded pilot.

7. The method of claim 4 wherein the particular DRS mode is associated with an RB structure in which at least one RB includes a plurality of REs reserved for DRSs including single beamformed or precoded pilots, and another RB includes a plurality of REs reserved for DRSs including composite beamformed or precoded pilots.

8. The method of claim 4 wherein the particular DRS mode is associated with an RB structure in which one RB includes a first group of plurality of REs reserved for DRSs including single beamformed or precoded pilots, and a second group of REs reserved for DRSs including composite beamformed or precoded pilots, and another RB includes a plurality of REs reserved for DRSs including composite beamformed or precoded pilots, and does not include any REs reserved for DRSs including single beamformed or precoded pilots.

9. The method of claim 4 wherein the particular DRS mode is associated with an RB structure in which each RB includes a first group of plurality of REs reserved for DRSs including single beamformed or precoded pilots, and a second group of REs reserved for DRSs including composite beamformed or precoded pilots.

10. The method of claim 1 further comprising:
receiving a DRS mode indicator signaling a DRS operating mode via higher layer signaling or lower layer signaling, wherein the DRS operating mode indicates the configuration of DRSs in the RBs.

11. The method of claim 1, wherein the indicated any of the first and second DRS modes are associated with the RB.

12. The method of claim 1, wherein:
the DRS mode indicator further indicates any of the first DRS mode, the second DRS mode, and a third DRS mode; and
the third DRS mode indicates (i) the at least one DRS comprises a plurality of DRSs, and (ii) the plurality of DRSs comprise at least one single beamformed or precoded pilot and at least one composite beamformed or precoded pilot.

13. The method of claim 1, wherein the DRS mode indicator is signaled by way of signaling for a layer above a physical layer.

14. The method of claim 1, wherein at least one of the RBs comprises at least one control-type data symbol that includes at least one DRS mode indicator bit that indicates the any of the first and the second DRS modes associated with the at least one RB.

15. A wireless transmit/receive unit (WTRU) comprising:
a multiple-input multiple output (MIMO) antenna configured to receive a plurality of resource blocks (RBs), each RB comprising a plurality of resource elements (REs), wherein the plurality of resource elements comprise at least one common reference signal (CRS) for a plurality of WTRUs, at least one dedicated reference signal (DRS) specific to the WTRU, and at least one data symbol;
a channel estimation unit configured to estimate an effective channel response based on the received REs in the RBs; and
a data detection unit configured to:
determine which of the REs include the at least one CRS;
determine which of the REs include the at least one DRS based on a DRS mode indicator signaled by way of at least one control-type data symbol, wherein the DRS mode indicator indicates any of first and second DRS modes, wherein the first DRS mode indicates the at least one DRS comprises a respective at least one single beamformed or precoded pilot, and wherein the second DRS mode indicates the at least one DRS comprises a respective at least one composite beamformed or precoded pilot;
detect data in the at least one data symbol based on an effective channel estimate response generated by the channel estimation unit; and
output decoded data.

16. The WTRU of claim 15, wherein the at least one DRS comprises a single beamformed or precoded pilot.

17. The WTRU of claim 16 wherein the at least one CRS does not include a beamformed or precoded pilot.

18. The WTRU of claim 17 wherein each of the RBs comprises at least one "control type" data symbol that includes at least one DRS mode indicator bit that indicates a particular DRS mode associated with the RB.

19. The WTRU of claim 18 wherein the particular DRS mode is associated with an RB structure in which each DRS includes a single beamformed or precoded pilot.

20. The WTRU of claim 18 wherein the particular DRS mode is associated with an RB structure in which each DRS includes a composite beamformed or precoded pilot.

21. The WTRU of claim 18 wherein the particular DRS mode is associated with an RB structure in which at least one RB includes a plurality of REs reserved for DRSs including single beamformed or precoded pilots, and another RB includes a plurality of REs reserved for DRSs including composite beamformed or precoded pilots.

22. The WTRU of claim 18 wherein the particular DRS mode is associated with an RB structure in which one RB includes a first group of plurality of REs reserved for DRSs including single beamformed or precoded pilots, and a second group of REs reserved for DRSs including composite beamformed or precoded pilots, and another RB includes a plurality of REs reserved for DRSs including composite beamformed or precoded pilots, and does not include any REs reserved for DRSs including single beamformed or precoded pilots.

23. The WTRU of claim 18 wherein the particular DRS mode is associated with an RB structure in which each RB includes a first group of REs reserved for DRSs including single beamformed or precoded pilots, and a second group of REs reserved for DRSs including composite beamformed or precoded pilots.

24. The WTRU of claim 15 wherein a DRS mode indicator signaling a DRS operating mode is received via higher layer signaling or lower layer signaling, wherein the DRS operating mode indicates the configuration of DRSs in the RBs.

25. The WTRU of claim 15, wherein the indicated any of the first and second DRS modes are associated with the RB.

26. The WTRU of claim 15, wherein:

the DRS mode indicator further indicates any of the first DRS mode, the second DRS mode, and a third DRS mode; and the third DRS mode indicates (i) the at least one DRS comprises a plurality of DRSs, and (ii) the plurality of DRSs comprise at least one single beamformed or precoded pilot and at least one composite beamformed or precoded pilot.

27. The WTRU of claim 15, wherein the DRS mode indicator is signaled by way of signaling for a layer above a physical layer.

28. The WTRU of claim 15, wherein at least one of the RBs comprises at least one control-type data symbol that includes at least one DRS mode indicator bit that indicates the any of the first and the second DRS modes a DRS mode associated with the at least one RB.

* * * * *

UNITED STATES PATENT AND TRADEMARK OFFICE
CERTIFICATE OF CORRECTION

| | | |
|---|---|---|
| PATENT NO. | : 8,401,094 B2 | Page 1 of 1 |
| APPLICATION NO. | : 12/052842 | |
| DATED | : March 19, 2013 | |
| INVENTOR(S) | : Pan et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1229 days.

Signed and Sealed this
Thirtieth Day of December, 2014

Michelle K. Lee
*Deputy Director of the United States Patent and Trademark Office*